R. MAYHEW.
BOOK.
APPLICATION FILED JUNE 10, 1916.
1,236,333.
Patented Aug. 7, 1917.
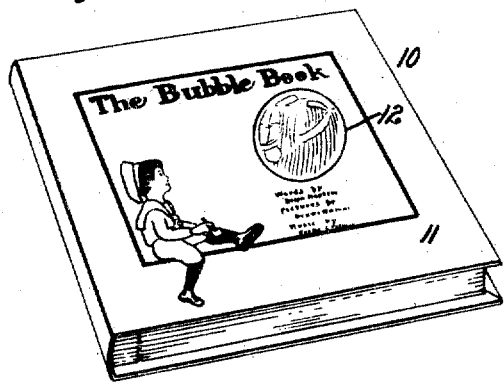
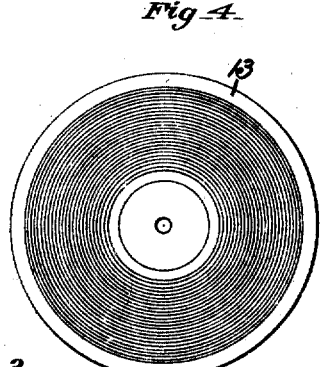
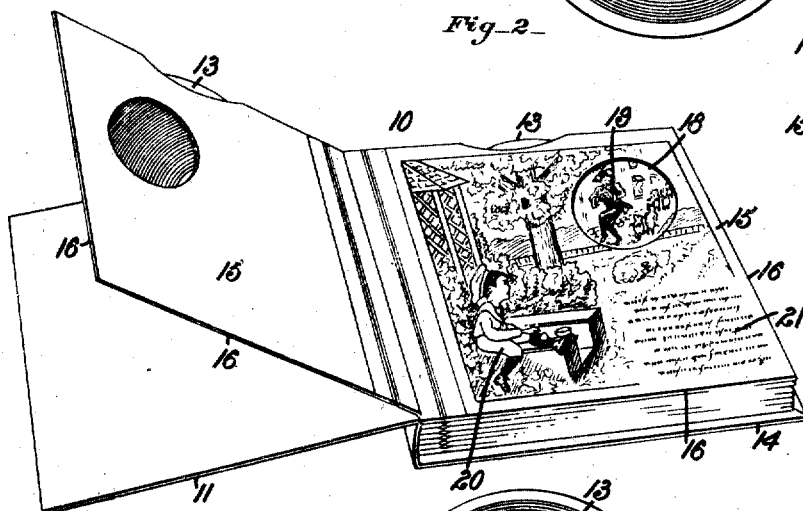
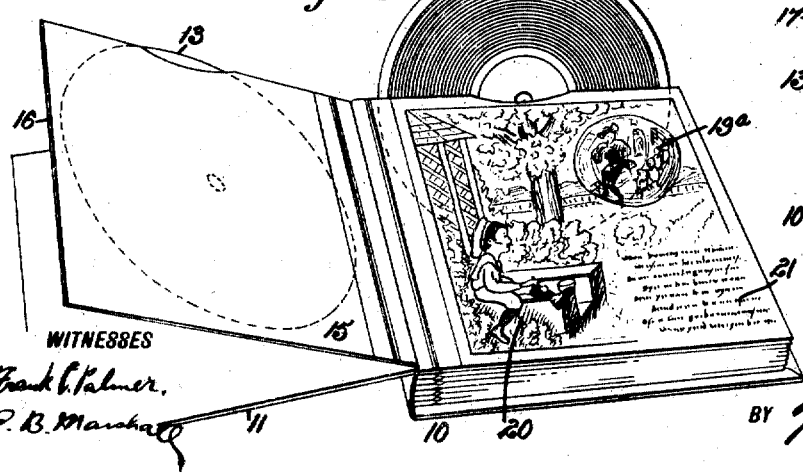
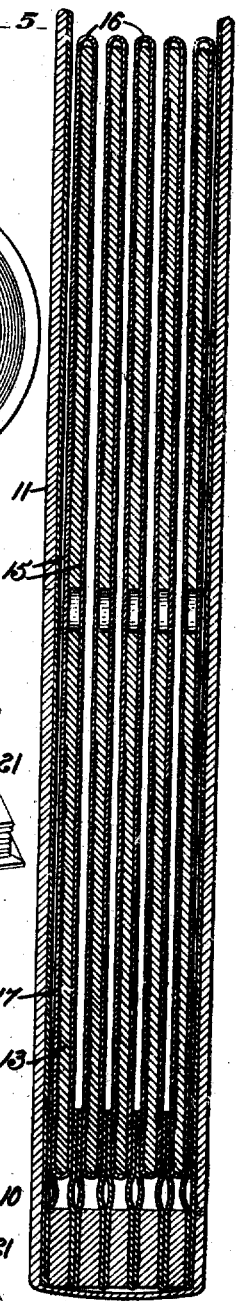
INVENTOR
R. Mayhew
BY
ATTORNEYS
WITNESSES

UNITED STATES PATENT OFFICE.

RALPH MAYHEW, OF NEW YORK, N. Y.

BOOK.

1,236,333. Specification of Letters Patent. Patented Aug. 7, 1917.

Application filed June 10, 1916. Serial No. 103,029.

*To all whom it may concern:*

Be it known that I, RALPH MAYHEW, a citizen of the United States, and a resident of the city of New York, borough of Manhattan, county and State of New York, have invented a new and Improved Book, of which the following is a full, clear, and exact description.

My invention has for its object to provide a book having a theme or story set forth in text, cuts or music, and having a sound reproducing record or records so that when or before a part or all of said text or cuts or music has been read, the sound reproducing record or records may be placed on the sound reproducing machine and operated.

By this means, the story or song which is printed and illustrated in the book may be heard at the time the text is read, and while the book is open at the cut illustrating the story or song. The theme is in this way brought to one's attention in various ways at the same time.

Additional objects of the invention will appear in the following specification, in which the preferred form of the invention is disclosed.

In the drawings similar reference characters denote similar parts in all the views, in which—

Figure 1 is a perspective view of the book;

Fig. 2 is a similar view showing the book in open position;

Fig. 3 is a view showing a modified form of the invention;

Fig. 4 is an enlarged view showing one of the talking machine records which are disposed in the pockets in the book; and Fig. 5 is an enlarged sectional view of the book.

In the drawings, I show a book 10 having for a title, "*The Bubble Book,*" the cover 11 of the book having printed thereon the representation of a child with a pipe used for blowing soap bubbles, a large soap bubble 12 being printed on the cover, the idea being that the child when blowing the bubbles sees in them various pictures which are illustrated and are referred to in the text and the talking machine records contained in the book. However, it is understood that the book which I will now describe may be used to convey any desired information, this information being imparted not only by the illustrations and the text to be found in the book, but also by the talking machine records 13 which are contained in the pockets adjacent the text and the illustrations to which they refer.

Between the front cover 11 and the rear cover 14 of the book there are bound a number of double pages 15, the edges 16 of adjacent pages 15 at their outer and bottom edges being secured together to form pockets 17 in which the talking machine records 13 are disposed, the pages 15 having openings 18 through which are exhibited illustrations 19 on the backs of the records 13, these illustrations 19 representing the pictures in the bubbles which appear as having been made by the child 20 shown on the front of the adjacent pages 15. The text 21 on the front of the adjacent pages 15 refers to the picture shown in the soap bubble represented in the cut 19 and the talking machine record contained in the pocket 17 on the back of which the cut 19 appears, refers to the theme presented in the text 21 and illustrated in the cut 19. It will, therefore, be understood that when the book which has been described is used, a child may turn the pages to one showing a cut 19 illustrating a picture represented in the soap bubble, and the child may read the text 21 below the cut, which refers to the theme illustrated in the cut, and in addition the talking machine record 13 having the cut 19 thereon, may be removed from its pocket 17 and may be placed in operative position in a talking machine, by which means the child who has examined the picture, may hear the story or song referring to the cut which has just been seen, and while the text is read.

Any number of adjacent leaves 15 may be provided, forming a number of pockets, it being understood that a different cut 19 will appear on the back of each talking machine record, so that this cut may be seen through the opening 18 in the front of the adjacent pages forming the pocket in which the talking machine record is contained, and that this cut will refer not only to the text printed adjacent thereto, but it will also refer to the story or song to which the record refers.

In Fig. 3 there is shown a modified form of the invention, in which pages 15 are provided without openings 18, the cuts 19$^a$ being printed on the pages.

Having thus described my invention, what I claim as new and desire to secure by Letters Patent is:

1. A book having pockets, and talking machine records disposed in the pockets, a story being published by the book through the media of matter printed on the sides of the pockets and matter recorded on the talking machine records disposed in the pockets.

2. A book having a pocket with an opening through one of its sides, having matter printed on the said side of the pocket relating to a theme, and a talking machine record in the pocket, having recorded thereon matter relating to the said theme, having on the said talking machine record matter which is exhibited through the opening in the pocket and which also relates to the said theme.

3. A book having a pocket, a talking machine record disposed in the pocket, a story being published by the book through the media of matter printed on the side of the pocket and matter recorded on the talking machine record disposed in the pocket.

4. A book containing a sound reproduction record as part of the book, a story or theme being published by the book through the media of printed matter in the book and matter recorded on the sound reproduction record.

5. A book having a sound reproducing record or records adapted to be used on a sound reproducing instrument and having in descriptive or portraying characters or both a theme or story in conjunction with or descriptive of the matter on said record.

RALPH MAYHEW.